(No Model.)  W. FRAZER.  5 Sheets—Sheet 2.
OIL LAMP.

No. 400,320.  Patented Mar. 26, 1889.

(No Model.) 5 Sheets—Sheet 3.
W. FRAZER.
OIL LAMP.
No. 400,320. Patented Mar. 26, 1889.
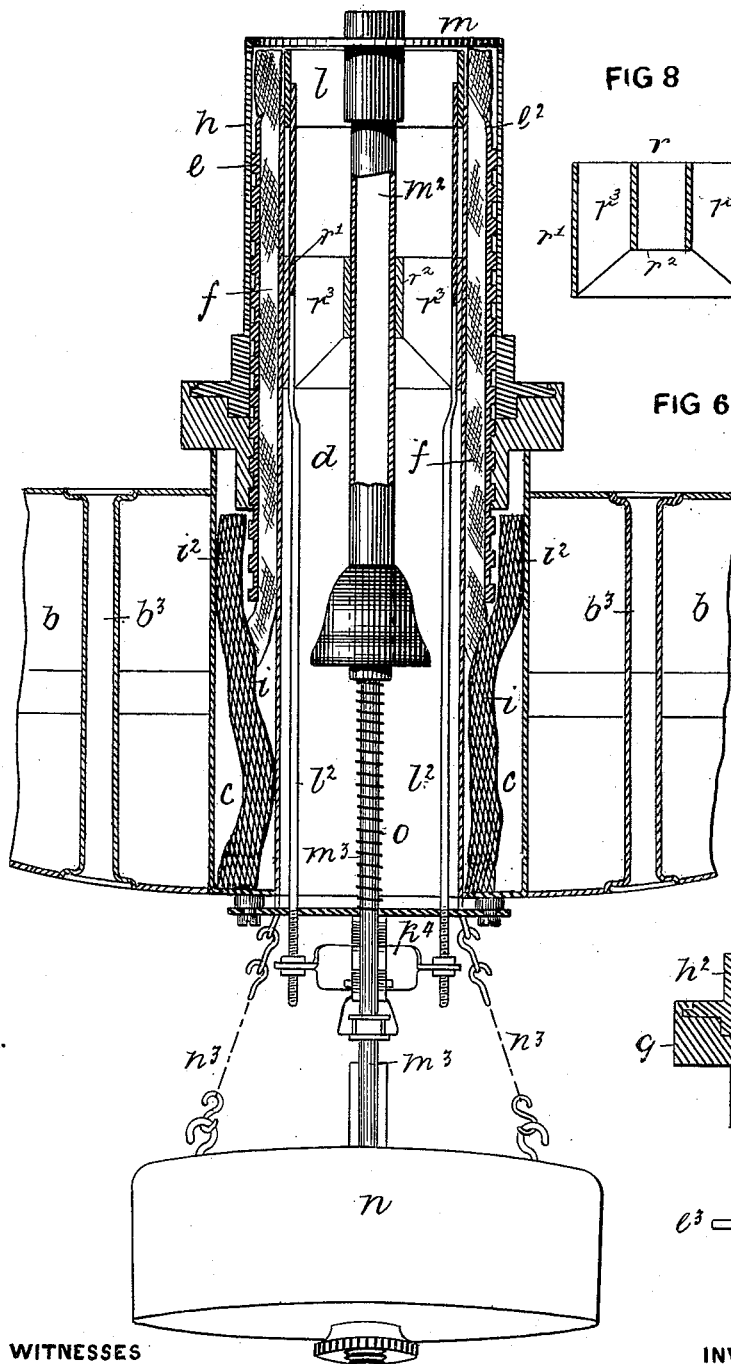
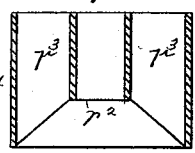
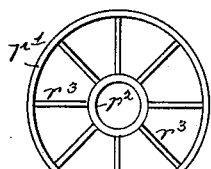
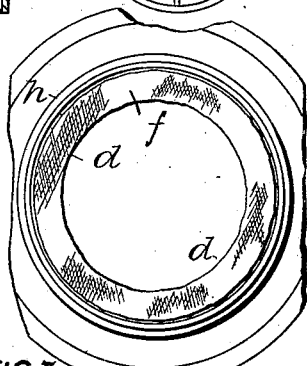
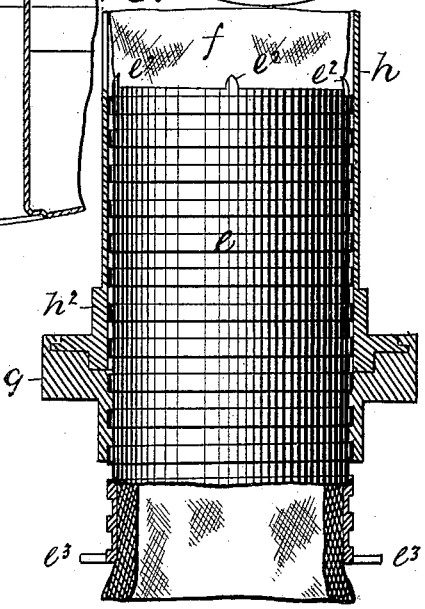
WITNESSES
Henry Skerrett
Frank W. E. Bristow
INVENTOR.
William Frazer
Connolly Bros attys (No Model.) W. FRAZER. 5 Sheets—Sheet 4.
OIL LAMP.
No. 400,320. Patented Mar. 26, 1889.
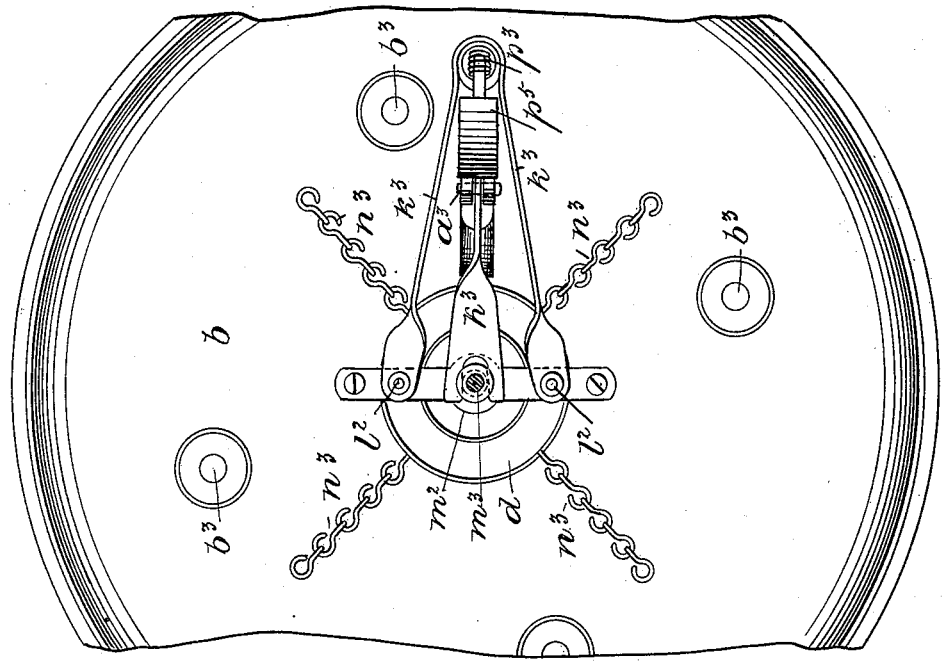
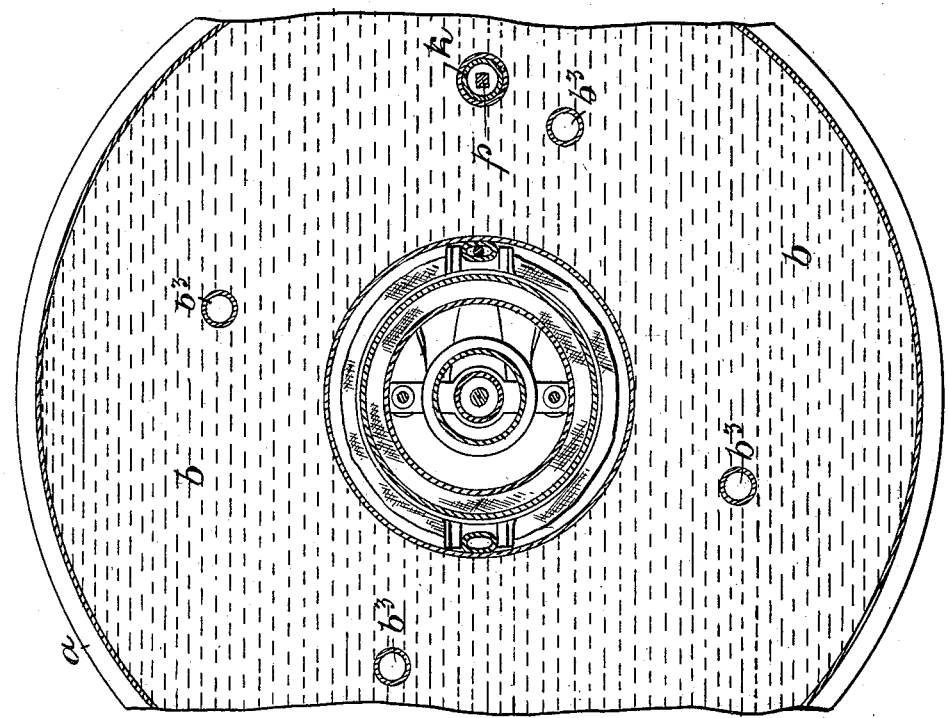

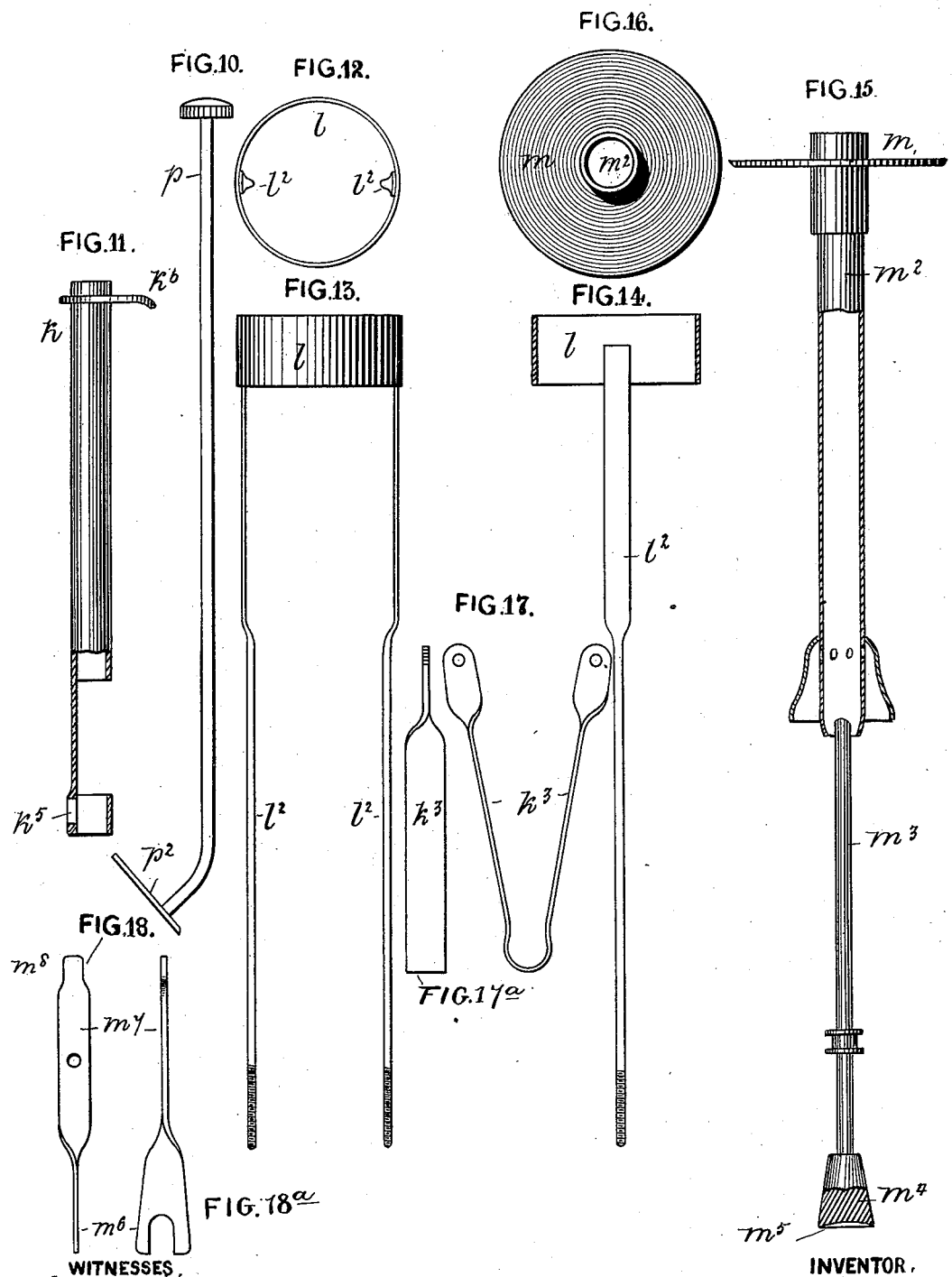

UNITED STATES PATENT OFFICE.

WILLIAM FRAZER, OF LONDON, COUNTY OF MIDDLESEX, ENGLAND.

OIL-LAMP.

SPECIFICATION forming part of Letters Patent No. 400,320, dated March 26, 1889.

Application filed September 23, 1887. Serial No. 250,512. (No model.) Patented in England October 1, 1886, No. 12,458; in Belgium July 28, 1887, No. 58,167; in France July 28, 1887, No. 172,129, and in Germany August 22, 1887, No. 9,758.

*To all whom it may concern:*

Be it known that I, WILLIAM FRAZER, a subject of the Queen of Great Britain, residing at London, in the county of Middlesex, England, engineer Riverdale House, Endymion Terrace, London, N., have invented certain new and useful Improvements in Oil-Lamps, (for which I have obtained the following patents: Great Britain, No. 12,458, dated October 1, 1886; Belgium, No. 58,167, dated July 28, 1887; France, No. 172,129, dated July 28, 1887; Germany, No. R. P. 9,758, dated August 22, 1887;) and I do hereby declare the following to be a full, clear, and exact description of the invention, reference being had to the accompanying drawings, which form part of this specification.

My invention consists of the following improvements in lamps for the burning of volatile hydrocarbon and other like oils, and by which said improvements complete combustion is thereby attained and the illuminating power of the flame greatly increased. The lamp is made safe, as explosions are impossible, in consequence of being provided with automatic extinguisher appliances, which instantly put out the flame should the lamp's erect position be changed, either by accident or by design. The oil-container is made a separate and independent chamber from the wick-receptacle, and only sufficient oil is admitted to the latter that is required to be burned, so that should the lamp by accident get knocked over no oil can escape or be spilled.

Figure 1:
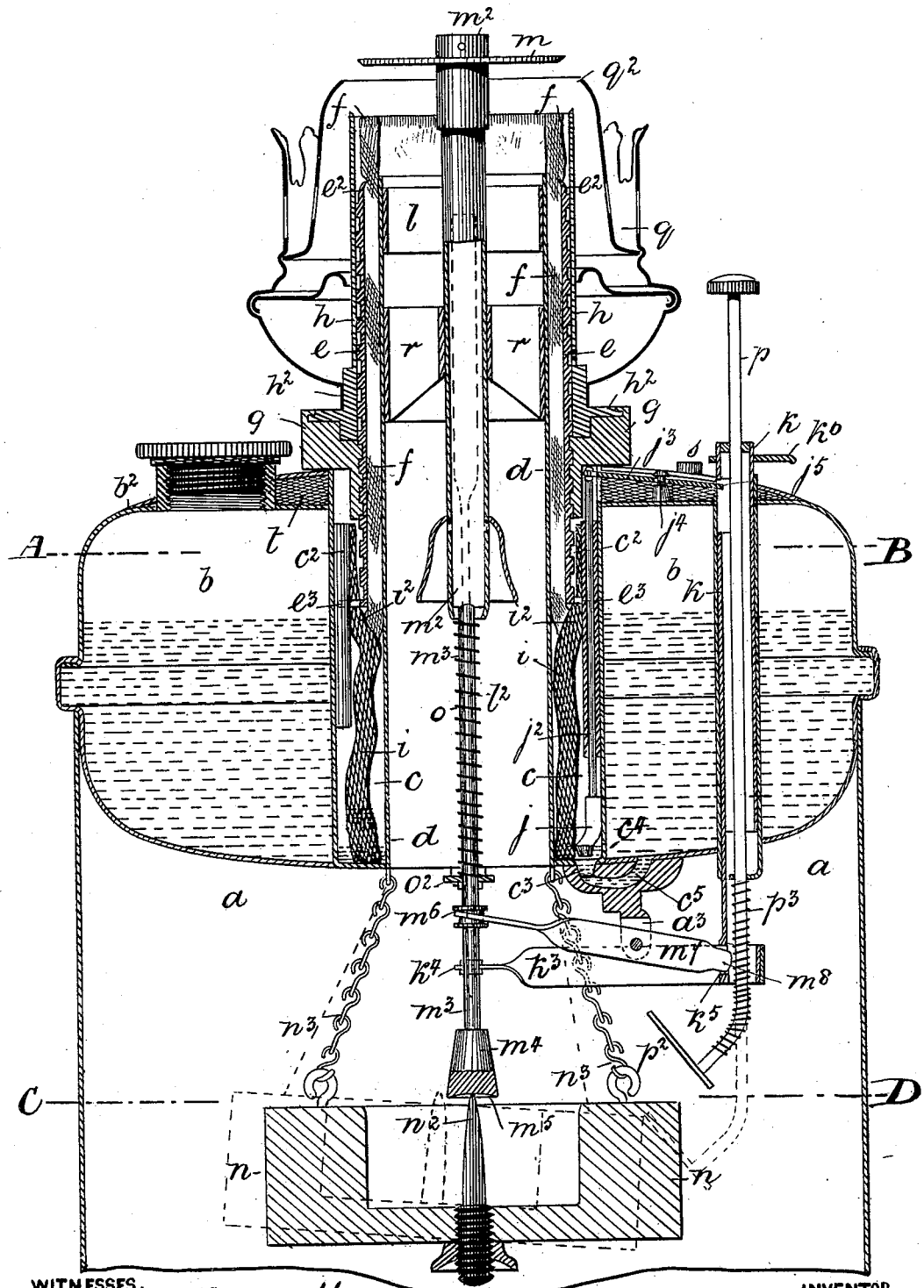
Figure 2:
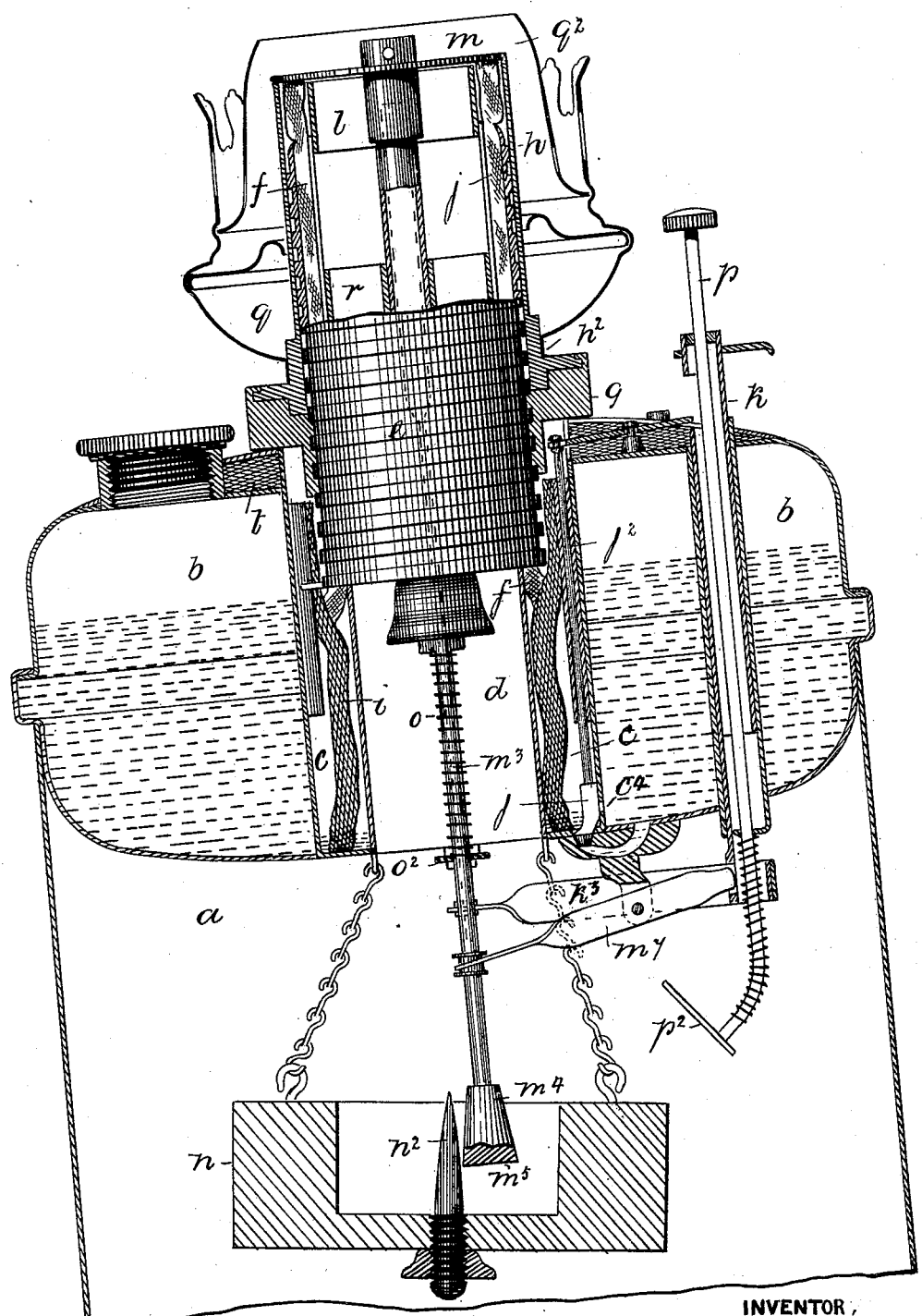

Figure 1 represents in longitudinal vertical section a lamp for the burning of light or volatile hydrocarbon oil constructed according to my invention. Fig. 2 represents the same in an inclined position and the light extinguished. Fig. 3 represents a vertical section of the said lamp, but taken at right angles to the sections, Figs. 1 and 2, in order to exhibit the rods, attachments, and means whereby the internal sliding shutter is worked. Fig. 4 is a horizontal section on the dotted lines A B, Fig. 1, and Fig. 5 is an inverted plan upon the dotted lines C D, Fig. 1. Figs. 6, 7, 8, 9, 10, 11, 12, 13, 14, 15, 16, 17, $17^a$, 18, and $18^a$ are detached parts shown separately.

The same letters of reference indicate corresponding parts in the several figures.

$a$ is the body of the lamp, or a sheet-metal inclosing-case, upon the upper part of which an oil container or reservoir, $b$, is situated. This oil-container forms, as it were, an outer jacket to the wick-chamber $c$ and axially-situated tube $d$, which tube $d$ constitutes an air-shaft or air-passage up the middle of the lamp, and through which air for supplying combustion to the burner is fed, and which said passage also serves as a means for the keeping of the burner and contiguous parts surrounding the wick-chamber and burner cool, and thereby preventing volatilization of the oil by the conduction of heat from the burner to the container parts, which is common to lamps of the ordinary kind. Arranged concentrically around the said air shaft or passage is a second tube, $e$, whose outside part is formed with a slow-threaded screw for the raising and lowering of a secondary or upper wick or wicks, $f$, inclosed within an annular space or division formed between the outside of the air-shaft tube and the inside of the externally-wormed tube, and which latter tube is provided with toothed-like prongs $e^2$, which pierce and secure the wick and compel it to travel with the said tube, which is made to rise and fall for the giving of more or less flame by exposing a greater or less superficial wick area to the burner part, and which said wicks are raised and lowered by a collar or internally-screwed nut, $g$, which is embraced between the top outer casing, $b^2$, of the oil-container $b$ and the base or lower part, $h^2$, of an outwardly-disposed concentric shield or tube, $h$.

The rising and falling or the feeding of the wick to the requisite height is accomplished by the simple screwing or the turning in one direction of the nut $g$, which gives the requisite traverse to the wick-carrying tube $e$. This tube is directed or guided vertically in its motion by forked snugs $e^3$, sliding upon guides $c^2$. The lower end of this last-named sliding tube $e$ moves within the upper part of the wick-chamber $c$, wherein the primary wick or wicks $i$ is or are disposed, and whose upper ends, $i^2$, are made contiguous to come in contact or to overlap the lower ends of the wick or wicks $f$, so as to make the said wicks continuous in the raising of the oil by capillary attraction through them. The bottom of the wick-chamber $c$, which is an annular or ring-like chamber, is provided at its bottom with a hole or valve-opening and seat, $c^3$, wherein a conical plug-valve, $j$, carried by a rod, $j^2$, and working within the body of the lamp, fits, and it is through this opening, bend, or trap $c^5$ that oil is admitted and flows from the container to the wick-chamber.

The wick-chamber $c$ has upon one side, and at a short distance above the valve-opening and seat $c^3$, a small hole, $c^4$, communicating with the oil container or reservoir $b$. This hole determines the level of the oil in the wick chamber or tube. Thus the flow of oil commences when the valve $j$ is opened, and which said oil rises up within the wick-chamber $c$ until it reaches or rises to the height of the hole $c^4$, and no more, as the covering over of the hole by the liquid prevents air insinuating itself through the oil in the oil-container—that is, on the hole being closed by the liquid no air can gain access to the inside top or interior of the oil-container, since the oil-container has no orifice or opening by which air can enter; consequently the flow of all oil is stopped. When the lamp is burning, the consumption of oil keeps or allows the small hole $c^4$ to remain sufficiently open for the insinuation therethrough and through the liquid of sufficient air to create the necessary flow, so that a small portion of air thus admitted to the oil-container allows a constant flow of oil to the wick-tube or wick-chamber. The flow of oil is therefore constant when the valve is open and the lamp burning, and is in proportion to the exact amount of oil to be burned, so that no more oil is admitted to the wick or wicks than is required to be immediately used. The valve-stem $j^2$ carries at its upper end a lever, $j^3$, fulcrumed about its middle at $j^4$, and with its outer end, $j^5$, disposed immediately under a gapped or shouldered part of a pusher-slide, $k$, working and sliding within a tube disposed through the oil-container, the lower end of which said pusher-slide carries an arm, $k^3$, directed toward the middle of the lamp and connected by a cross-arm, $k^4$, to the depending rods $l^2 l^2$, (see Fig. 3,) which carry at their upper extremities an extinguisher wick-shutter, $l$. This shutter, which is in the form of a short length of tubing, fits accurately within the tubing forming the air-shaft, and also works within and covers up (when in its extinguishing position) the inside top portion of the wick immediately below the flame-deflector $m$. This deflector, which is a combined deflector and extinguisher, consists of a circular disk of sheet metal mounted at or near the top of an open-ended tube, $m^2$, extending axially about two-thirds the distance down the air-shaft. This tube is made bell-mouthed at its bottom for collecting air, which is conveyed up the tube into the interior of the flame through the open top end, and at the lower end of the said tube $m^2$ a rod, $m^3$, is rigidly connected, having at its bottom a coned boss, $m^4$, with a slightly concaved or flat under side, $m^5$, and at a short distance above the boss an inwardly-disposed end, $m^6$, of a lever, $m^7$, is connected, and which said lever is fulcrumed from a hanger-bracket, $a^3$, situated on the under side of the oil-container. The outwardly-disposed end, $m^8$, of the operating-lever aforesaid takes within a gapped part, $k^5$, of the lower end of the pusher-slide $k$, so that on the pusher-slide being pressed down by its pusher $k^6$ it takes both the wick-extinguisher shutter out of its extinguishing position, and also raises the flame-deflector to its proper position for the burning of the lamp, so that the downward movement of the pusher-slide aforesaid gives contrary movements to the deflector and shutter by making them approach or recede from each other for extinguishing and lighting; and, further, the downward movement also brings the coned boss at the end of the rod in its proper position with respect to the spike $n^2$, carried by or within the middle or sunken part of the suspended weight $n$, and it is by means of this weight, which is suspended by chains $n^3$ from the under side of the lamp-reservoir, that the lamp is made self-extinguishing should it get accidentally thrown over. The return movements of the parts on the pusher being liberated, or on the cone part being freed from the spike, either by the side movement of the weight (in case of accident) or the pressing of the weight aside for extinguishing, are accomplished by a coiled spring, $o$, encircling the rod $m^3$, and with the ends of the said spring secured to the under side of a bar crossing the bottom of the tube $m^2$, and to a fixed cross-bar, $o^2$, carried by the body of the lamp, respectively.

$p$ is a pusher-rod working centrally within the pusher-slide and having at its bottom part an inclined foot, $p^2$, and coiled spring $p^3$. This pusher-rod is for the purpose of ordinary extinguishing, and is performed by making the foot end $p^2$ push aside the weight $n$, as represented in the dotted lines, (see Fig. 1,) so as to remove the end of the spike $n^2$ from under the coned boss $m^4$, so as to allow the extinguisher parts to rise and fall, respectively, in manner and in ways already specified.

$q$ is an ordinary burner-body with a circular burner-aperture, $q^2$, and which said body and burner part surrounds the upper part of the air-shaft tube and extinguisher.

Within the air-shaft passage, and within a short distance from the top thereof, an air-distributer, $r$, is situated, as best seen in the separate views, section, and elevation, Figs. 8 and 9, consisting of an annular outer and inner ring, $r'$ $r^2$, having radially-disposed vanes or plates $r^3$, situated between them, and which said plates or vanes, which are preferably disposed vertically and parallel, are for the purpose of evenly distributing the air being fed up the shaft to the burner. Thus the upward air-current, which is irregular in its constitution, is made to impinge upon the vanes or edges of the plates aforesaid, so as to evenly break up into uniform layers the air fed for combustion, and, moreover, the impetus of the air-current is also checked without lessening the body of air supplied. The volatilized oil or the gaseous products given off from the oil in tube $c$ is allowed to escape through ventilator-holes $s$, which are situated at the top of the body of the lamp, which is a kind of top or supplementary covering, and between its under side and the top of the oil-container a non-conducting material, $t$—such as cork or the like—is interposed. This interposition of a non-conductor isolates the principal metallic parts of the burner from the oil-reservoir and wick-chamber.

When the lamp is required to be used, press downward the pusher $k^6$, when the pusher-slide is lowered and the extinguisher parts taken out of action, and with the valve $j$ removed from its seat $c^3$, so that oil can now flow from the oil-container into the wick-chamber, so that when the lamp is in use it is in the position as represented in Fig. 1, with the wick $f$ exposed a little above the top of the shield or tube $h$, and in order to increase or decrease the size of the flame it is only necessary to raise or lower the wick, which is done by turning the nut or collar $g$, when the wick-tube $e$, and wick with it, is raised or lowered accordingly.

To extinguish the lamp in the ordinary way, press vertically the pusher $p$ by the button upon its top end, when the suspended weight $n$, which holds the extinguisher expedients in position, is pushed aside, which removes the top of the spike $n^2$ from the under side of the coned boss $m^4$, thereby liberating the tube and rod $m^2$ $m^2$, carrying the flame-deflector $m$, and also liberating at the same time the slide $k$ and parts carried by it, which operates or presses upward the shutter $l$ to a position as represented in Fig. 3, so as to thereby inclose or box up the wick in such a manner as to extinguish the light—that is, the removal of the weight from a central position by the pusher aforesaid releases the extinguisher expedients, which are automatically operated by the coiled spring $o$, which pulls downward the rod and parts carried by it, so as to bring the under side of the flame-deflector $m$ upon the exposed burning top part of the wick. The said downward movement of the said rod $m^3$ turns the lever $m^7$ upon its center and presses upward the slide K. This upward motion of the said slide carries with it the arm $k^3$, which is connected at its inner end to the shutter-hanging rods $l^2$. Thus the combined motions, as aforesaid, respectively raise and lower the deflector and shutter in opposite directions, and when brought together they extinguish the flame by the boxing up of the inclosed top end of the wick.

The act of extinguishing and the pressing upward of the slide also closes the valve $j$ through the intervention of the lever $j^3$.

The automatic extinguishing by accident, instead of by design, on the upsetting of a lamp is effected in the same manner as has been previously described, other than that the weight is removed from a central position by gravity, instead of by the pusher-rod—that is, instantly the lamp becomes inclined the extinguisher-weight, not partaking of the motion of the said lamp, liberates the parts held in position by its turning aside, as fully represented in Fig. 2.

The oil-container is provided with vertical air-passages $b^3$, for the purpose of keeping down the temperature of the oil contained within the said container, and which is best seen in Figs. 3, 4, and 5.

Having thus described my invention, I claim as new and desire to secure by Letters Patent—

1. In a lamp, the combination, with an oil-reservoir entirely closed above the oil-level, of an annular wick-chamber communicating with said oil-reservoir below the level of the oil, and a supplementary cover to said oil-reservoir forming a space communicating with said wick-chamber and provided with a ventilating-opening, substantially as described.

2. In a lamp, the combination, with an oil-reservoir, $b$, a central annular wick-chamber, $c$, and an intervening passage, $c^5$, of a valve, $j$, adapted to close said passage, and mechanism, substantially as described, for operating the same, as set forth.

3. In a lamp, the combination, with extinguisher-plate $m$, tube $m^2$, supporting said plate, and rod $m^3$, connected to tube $m^2$, of pivoted lever $m^7$, connected to said rod, and slide $k$, connected with said lever and provided with pusher $k^6$, all substantially as described.

4. In a lamp, the combination, with deflector $m$, sliding tube $m^2$, rod $m^3$, spring $o$, pivoted lever $m^7$, and slide $k$, of sliding shutter $l$, rods $l^2$ $l^2$, and forked lever $k^3$, connected to said rods $l^2$ $l^2$ and to the slide $k$, substantially as described.

5. In a lamp, the combination, with deflector-plate $m$ and tubes $m^2$ $m^3$, supporting said deflector, of suspended weight $n$, spike $n^2$, projecting from said weight and supporting the tube $m^2$ $m^3$, sliding rod $p$, and plate $p^2$, the latter being arranged to contact with and displace said weight, thereby extinguishing the lamp, substantially as described.

In testimony that I claim the foregoing I have hereunto set my hand this 12th day of July, 1887.

WILLIAM FRAZER.

Witnesses:
HENRY L. KERRETT,
FRANK W. E. BRISTOW,
*Both of Birmingham.*